US006761185B1

(12) United States Patent
De Leeuw

(10) Patent No.: US 6,761,185 B1
(45) Date of Patent: Jul. 13, 2004

(54) CONSTANT GAS FLOW REGULATING DEVICE

(75) Inventor: Jan De Leeuw, Akersberga (SE)

(73) Assignee: Aerocrine AB (SE)

( * ) Notice: Subject to any disclaimer, the term of this patent is extended or adjusted under 35 U.S.C. 154(b) by 0 days.

(21) Appl. No.: 10/018,431

(22) PCT Filed: Jun. 21, 2000

(86) PCT No.: PCT/SE00/01323

§ 371 (c)(1),
(2), (4) Date: Apr. 8, 2002

(87) PCT Pub. No.: WO00/79357

PCT Pub. Date: Dec. 28, 2000

(30) Foreign Application Priority Data

Jun. 22, 1999 (SE) ................................. 9902377

(51) Int. Cl.[7] .................................................. G05D 7/01
(52) U.S. Cl. ...................................... 137/503; 137/508
(58) Field of Search ................................. 137/503, 508, 137/517, 859

(56) References Cited

U.S. PATENT DOCUMENTS

| 1,038,527 | A | * | 9/1912 | Coleman | 137/508 |
| 1,997,404 | A | * | 4/1935 | Hamilton | 137/508 |
| 3,431,944 | A | * | 3/1969 | Sakuma | 138/45 |
| 4,032,070 | A | * | 6/1977 | Nielsen | 137/503 |
| 4,241,757 | A |   | 12/1980 | Bron | |
| 4,461,517 | A | * | 7/1984 | Enderle | 138/46 |
| 5,363,876 | A |   | 11/1994 | Nash | |
| 5,685,296 | A |   | 11/1997 | Zdrojkowski et al. | |
| 5,937,855 | A |   | 8/1999 | Zdrojkowski et al. | |

FOREIGN PATENT DOCUMENTS

GB         816212         7/1959

* cited by examiner

Primary Examiner—Stephen M. Hepperle
(74) Attorney, Agent, or Firm—Banner & Witcoff, Ltd.

(57) ABSTRACT

A constant gas flow regulating device includes an inlet chamber, an outlet chamber and a movable wall that delimits the inlet and outlet chambers from each other. The moveable wall carries a body comprising an opening that permits communication between the inlet and outlet chambers. An elongate element extends centrally in the opening of the body in the moving direction of the wall. The opening within the body surrounds a portion of the elongate element. In a first position the opening in the movable wall is placed in the vicinity of a first end of the elongate element. The element has a sectional size that gradually increases from the first end to a second end thereof. The size of the opening in the movable wall is larger than the sectional size of the elongate element. A helical spring biases the movable wall towards a first position.

12 Claims, 1 Drawing Sheet

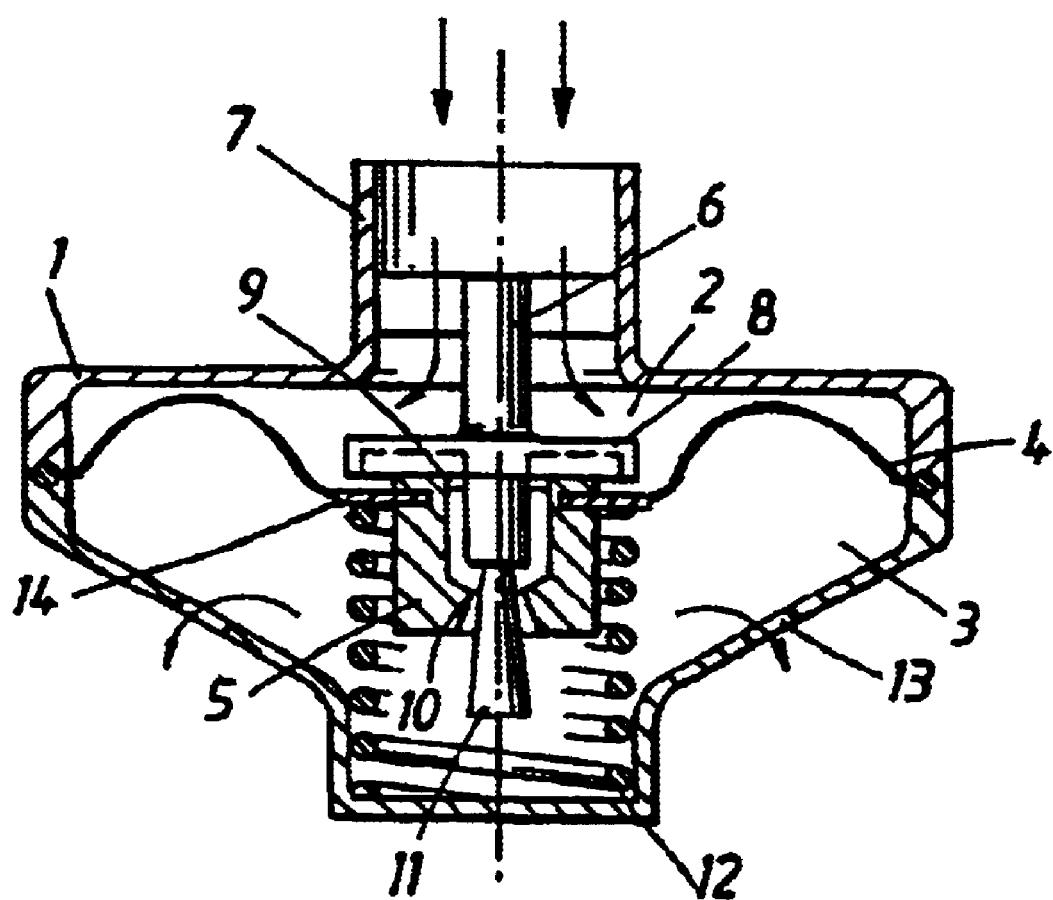

CONSTANT GAS FLOW REGULATING DEVICE

This is a U.S. National Phase Application Under 35 USC 371 and applicant herewith claims the benefit of priority of PCT/SE00/01323 filed Jun. 21, 2000, which was published Under PCT Article 21(2) in English and Application No. 9902377-2 filed in Sweden on Jun. 22, 1999.

TECHNICAL FIELD

The present invention relates to a constant flow regulating device having an inlet chamber and an outlet chamber.

BACKGROUND OF THE INVENTION

Many diseases may be diagnosed by studying the concentration of certain substances, for example nitric oxide, in the exhalation air of a person. However, since the pressure of the exhaled air varies from person to person, the volume of air passing through a test tube or the like per unit of time will vary considerably. There is therefore a need for a device that will create a constant flow of exhaled air to a test tube or the like independent of the pressure of the exhaled air. The object of the present invention is to provide such a device.

SUMMARY OF THE INVENTION

This object is obtained by a constant gas flow regulating device having an inlet chamber and an outlet chamber, a movable wall delimits the inlet and outlet chambers from each other, said wall comprising an opening permitting communication between said chambers, an elongate element extends centrally in the opening in the movable wall in the moving direction thereof, in a first position the opening in the movable wall is placed in the vicinity of a first end of the elongate element, said element having a sectional size that is gradually increasing from the first to a second end thereof, the size of the opening in the movable wall is larger than the sectional size of the elongate element, characterised in that a helical spring for biasing the movable wall towards a first position is provided and that a body attached to the movable wall and containing the opening surrounding a portion of the elongate element is slidably connected with an elongate guiding member defining the moving direction of the movable wall.

By such a device the space between the outer periphery of the elongate element and the inner periphery of the opening in the wall will decrease proportionally to the increase in pressure in the inlet chamber so that the pressure in the outlet chamber will be held constant independent of the pressure in the inlet chamber.

In the preferred embodiment the elongate element has a first end disposed in the inlet chamber and a second end disposed in the outlet chamber. The sectional shape of the elongate element corresponds to the sectional shape of said opening, the sectional shape of the opening in the movable wall and of the elongate element being circular and the elongate element having the shape of a truncated cone. The movable wall can be a diaphragm. Preferably the constant flow is in a range between 0.5 and 4.5 1/min and more preferably between 0.6 and 3 1/min.

BRIEF DESCRIPTION OF THE DRAWING

The present invention will now be described with reference to the enclosed Figure, which shows a sectional view of a preferred embodiment of a constant flow regulating device according to the invention.

DESCRIPTION OF AN EMBODIMENT

The device in the figure comprises a housing 11, the inner space of this housing being divided into an inlet chamber 2 and an outlet chamber 3 by a diaphragm 4 of a flexible material, for example silicon rubber or latex. A cylindrical hollow body 5 is attached to the diaphragm 4 and is extended from the diaphragm in the downward direction in the Figure. The body 5 has a it end which is situated in the inlet chamber 2 and a second end situated in the outlet chamber 3.

A guide member 6 substantially in the form of a cylindrical body is extended centrally inside the housing 1 from a tube-shaped upper end 7 thereof in the downward direction of FIG. 1. The guide member 6 is supported by the housing by any appropriate means permitting air to pass through the tube end 7 into the inner space of the housing 1. The guide member further comprises a seat element 8 in the form of an annular flange which is situated a distance from the upper wall of the housing 1.

The hollow cylindrical body 5 has an inner diameter that is greater than the outer diameter of the guide member 6 so that an annular space exists between the outside of the guide member and the inside of the body 5. Furthermore, the first end of the body comprises means 9, for example at least one guiding and connecting member, for slidably connecting the body 5 with the guide member 6. The guiding and connecting member(s) can include three guiding pins or an annular sleeve. If an annular sleeve is used it should be connected to the main part of the body 5 by radially directed connecting pins or the like so that air can pass between the body and the annular sleeve.

The second end of the body 5 contains a circular opening 10 with a smaller size than the inner diameter of the body 5 leading into the outlet chamber 3. The opening 10 has a sharp edge and the walls of the body 5 defining the opening 10 are diverging relative to each other from said edge.

An elongate element 11 is extending downwardly from central part of the second end of the guide member 6. This element has a circular sectional shape with a size that is increasing in the downward direction in the Figure. In the shown embodiment the element 11 has the form of a truncated cone. The element 11 and the member 6 are preferably made of the same material and integrated into a single piece of material.

Furthermore, a helical spring 12 is extended between the diaphragm 4 and the lower wall of the housing 1. The body 5 is by this spring 12 biased towards a first position in which the first end thereof is seated against the annular flange 8 of the guide member 6. The diaphragm is reinforced by a rigid annular plate in the central area so that the spring 12 acts against this annular plate 14.

The device described above functions in the following way. Before use the pressures in the inlet and outlet chambers are equal and the body 5 is situated in the first position. When air exhaled by a person flows into the inlet chamber 2 via the inlet tube 7 the pressure in the inlet chamber becomes greater than in the outlet chamber, the pressure difference causing the diaphragm and thereby the body 5 to move downwards against the force of the spring 12. The exhaled air can then pass through the space between the outside of the element 11 and the edge of the opening 10 in the second end of the body 5 into the outlet chamber 3.

However, due to the pressure drop over the passage between the inlet and the outlet chamber, a difference in pressures between the chambers will always exist, the pressure in the outlet chamber being less than in the inlet chamber. In the Figure, the body 5 has moved downwards from the first position pressing against the seat 8 and the exhaled air flowing into the inlet chamber 2 flows in the passage between the edge of the opening 10 and the outside of the elongate element 11, into the outlet chamber 3 and leaves this chamber through openings 13 therein, as is indicated by arrows in the Figure.

The greater the pressure in the inlet chamber is, the longer distance will the body travel 5 in the downward direction in the Figure. However, the longer distance the body 5 will travel, the smaller the space between the edge of the opening 10 and the outside of the elongate element 11 will be. Thus, the higher the pressure in the inlet chamber, the smaller the passage between the inlet and the outlet chambers will be The space between the outside of the element 11 and the edge of the opening 10 will thus define an annular regulating opening with a varying size dependent of the pressure in the inlet chamber.

By rightly dimensioning the increase in sectional size of element 11 in the downward direction, the pressure drop over this regulating opening can be made to increase with pressure in such a way that a constant flow of air passes through this regulating opening for varying pressures in the inlet chamber. The pressure drop over this regulating opening needed for maintaining a constant pressure in the outlet chamber and the size of the regulating opening for obtaining such a pressure drop is relatively easy to calculate. Its also relatively easy to calculate the movement of the body 5 in dependence of the pressure difference between the inlet and outlet chambers for varying inlet chamber pressures and in dependence of the force of the helical spring 12 and thereby the sectional increase in size of the element 11 is relatively easy to calculate.

For a constant flow regulating device for maintaining a constant flow of exhaled air out of the outlet chamber 3 through openings 13 in the housing 1 for a pressure in the inlet chamber varying between 500–2000 Pa and with an opening in the body 5 having a diameter of 3.5 mm and a linear helical spring with a spring constant of 250 N/m, a cone angle of $1/70$ of the elongate element 11 will make the pressure in the outlet chamber 3 independent of the variation pressure in the inlet chamber 2 within the above mentioned limits and with the required accuracy.

The helical spring is pretensioned to a force corresponding to a pressure of 500 Pa in the inlet chamber 2 and the body 5 will thus not move until the pressure in the inlet chamber exceeds 500 Pas. If the pressure in the inlet chamber exceeds 2000 Pa, the body 5 have travelled along the elongate element 11 to a point thereof when the sectional size of the element is equal to the diameter of the opening 10 and the passage between the inlet and the outlet chambers is then closed.

For the described embodiment, the calculations mentioned above led to an elongate element having a linear increase in sectional size. Such an element is easy to manufacture However, for other parameters the calculations may lead to an elongate element that gradually increases in sectional size along a curve. The sectional shapes of the opening in the diaphragm and the elongate element need not necessarily correspond to each other or be circular. However, if those shapes correspond to each other and are circular, the calculations are facilitated and the flow of air through the regulating opening will be more undisturbed. Furthermore, the passage between the inlet chamber and the outlet chamber can not be closed when the pressure in the inlet chamber exceeds the maximum pressure allowed if the shapes of the opening in the diaphragm and the sectional shape of the elongate element differ from each other. A circular shape of the opening in the diaphragm and a circular sectional shape of the elongate element is therefore preferred.

Example introduced during the priority interval

Another example of a flow regulating device has a diaphragm of 44 mm with an opening of 3.2 mm and a linear helical spring with a spring constant of 66 N/m. The elongate element has a cone angle of 1:42.5 and the gap between the diaphragm and the elongate element will vary between 0.17–0.10 mm when the pressure varies between 500–2000 Pa. This will give a constant flow of 2.7 1/min.

In order to facilitate the manufacturing of the elongate element and to obtain the required accuracy, the cylindrical body should be allowed to travel at least a distance twice the diameter of the smallest diameter of the elongate element.

All parts of the described flow regulating device except the spring and the diaphragm are preferably made of plastic material, for example polyamide, polyprophene or polyethene. However, metal materials can also be used.

The device is shown in the figure with the moving direction of the movable wall 4 being downwards-upwards. However, the described device will function in the same way independent of placement of the housing.

The described embodiment can of course be modified in several ways within the scope of the present invention. The diaphragm could for example be made of a resilient material in which case the helical spring can be deleted. In such a case it is important that the material of the diaphragm is reinforced in the area surrounding the opening therein so that the dimensions of the opening will not change during the elastic sketching of the diaphragm. The movable wall need not be a diaphragm but could be a rigid wall slidably supported in the housing. However, a diaphragm is preferred since air tightness between the outer edge of the diaphragm and the wall of the housing is easy to accomplish Furthermore, the spring could be seated against the second end of the cylindrical body 5 instead of pressing against the rigid part of the diaphragm as in the shown embodiment. The housing can have another shape than in the Figure and other guiding means can be used for guiding the body 5, for example a perforated guiding sleeve disposed in the outlet chamber can surround the body 5, the scat element defining the first position of the body then being separate from the guiding member and placed in the inlet chamber. However, the shown guiding means are preferred since the elongate element, the seating for the cylindrical body and its guiding means can be integrated in a single piece of material. The scope of the invention shall therefore only be restricted by the content of the enclosed claims.

What is claimed is:

1. A gas flow regulating device, comprising:
   an inlet chamber;
   an outlet chamber;
   a movable wall delimiting the inlet and outlet chambers from each other;
   a body comprising an opening, said body being moveable with said wall;
   a fixed elongate element extending centrally in the opening of said body in the moving direction of said moveable wall, thereby defining an annular space between a portion of the elongate element and the opening that permits communication of gas between the chambers, said elongate element having a first end disposed in the inlet chamber and a second end disposed in the outlet chamber, and having a sectional size gradually increasing from its first end to its second end;

a helical spring for biasing the movable wall towards a first position where the movable wall is placed such that said opening of said body is located in the vicinity of the first end of the elongate element; and said body being attached to the movable wall and containing the opening surrounding said portion of the elongate element, at least one guiding and connecting member slidably connecting said body with a fixed elongate guiding member for guiding the wall when moved, wherein, when the gas pressure increases in the inlet chamber, the wall is moved from said first position towards the second end of the elongate element, thereby gradually decreasing the size of said annular space between the opening and the elongate element, so as to obtain a constant gas flow from the inlet chamber to the outlet chamber independent of pressure variations in the inlet chamber.

2. The device according to claim 1, wherein the body is seated against a seat element in the first position.

3. The device according to claim 2, wherein the seat element comprises an annular flange provided on the guiding member.

4. The device according to claim 1, wherein said at least one guiding and connecting member comprises a plurality of guiding pins.

5. The device according to claim 1, wherein said at least one guiding and connecting member comprises an annular sleeve.

6. The device according to claim 1, wherein the sectional shape of the elongate element corresponds to the sectional shape of the opening.

7. The device according to claim 6, wherein the sectional shape of the opening and the elongate element, respectively, is circular.

8. The device according to claim 1, wherein the elongate element has the shape of a truncated cone.

9. The device according to claim 1, wherein the movable wall includes a diaphragm.

10. The device according to claim 9, wherein the diaphragm is reinforced by a rigid annular plate, and wherein the helical spring acts against said plate.

11. The device according to claim 1, wherein the guiding member is disposed in the inlet chamber and the elongate member extends from the guiding member.

12. The device according to claim 11, wherein the guiding member and the elongate element are integrated into a single piece of material.

* * * * *